Patented Feb. 21, 1950

2,498,300

UNITED STATES PATENT OFFICE 2,498,300

PRODUCTION OF LYSINE

Norman D. Scott, Sanborn, and Arthur O. Rogers, Lewiston, N. Y., assignors to E. I. du Pont de Nemours & Company, Wilmington, Del., a corporation of Delaware No Drawing. Application November 26, 1948, Serial No. 62,246

27 Claims. (Cl. 260—534)

This invention relates to the production of lysine and more particularly it relates to a novel process for the production of lysine.

This application is a continuation-in-part of copending application Serial No. 789,754 filed December 4, 1947.

Lysine, a material which is potentially of major commercial importance in animal nutrition has not been prepared synthetically on a commercial scale so far as we are aware. This compound has been prepared from casein, gelatin or other protein materials and also from caprolactam as described by Eck and Marvel in Org. Syn. 19, 61–63 (1939). Neither of the previously known methods for obtaining lysine has been utilized for large scale manufacture.

It is one of the objects of this invention to provide a new and practical process for the production of lysine which is suitable for use on a commercial scale. Another object is to provide a process for the production of lysine from delta-hydroxyvaleraldehyde or dihydropyran and other readily available materials.

The above objects are attained in accordance with our invention by reacting in an aqueous system at elevated temperatures delta-hydroxyvaleraldehyde, a compound yielding carbonate ions, a compound yielding ammonium ions and a compound yielding cyanide ions to produce 5-(delta-hydroxybutyl) hydantoin; reacting said hydantoin with hydrogen chloride or hydrogen bromide to form 5-(delta-chlorobutyl) hydantoin or 5-(delta-bromobutyl) hydantoin and reacting said chlorobutyl hydantoin or bromobutyl hydantoin with a base from the group consisting of quaternary ammonium, alkali metal or alkaline earth metal bases, condensing the resulting hydantoin salt to form poly-3,5-tetramethylene hydantoin and hydrolyzing the poly-3,5-tetramethylene hydantoin.

The following illustrate the reactions occurring in the process of our invention:

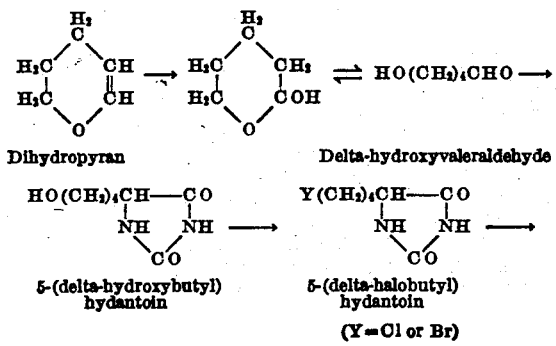

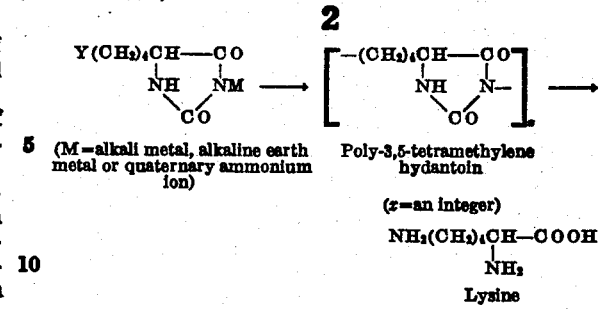

In carrying out the first step of our novel process it is preferred to react a compound yielding carbonate ions, a compound yielding ammonium ions and a compound yielding cyanide ions directly with the products obtained by the hydration of dihydropyran in a dilute aqueous acid medium.

In general we may proceed by hydrating dihydropyran in a dilute mineral acid. For example, there may be utilized 0.02 N hydrochloric acid to which dihydropyran is added with agitation and heating. We have found that about 200 cc. of 0.02 N hydrochloric acid is suitable for each mole of dihydropyran. Although the concentration of the mineral acid is in general not critical, at least one mole of water should be present for each mole of dihydropyran utilized. It is preferred to utilize an excess of water, for example, about 10 moles of water for each mole of dihydropyran. The reaction is exothermic and the temperature may rise to about 80° C. At a temperature of 60–80° C., the reaction is rapid and is usually complete in about 15 minutes. The time required for complete reaction may be decreased by utilizing pressures greater than atmospheric and when operating under increased pressure, temperatures up to 150° C. are satisfactory. When the reaction mixture becomes clear, the reaction is complete and the mixture of reaction products may then be neutralized with an alkali, for example, with sodium bicarbonate to minimize polymerization of hydroxyvaleraldehyde present.

The mixture thus obtained by the acid hydration of dihydropyran is suitable for use directly in the prepartion of 5-(delta-hydroxybutyl) hydantoin. However, if desired, delta-hydroxyvaleraldehyde may be isolated from the mixture by distillation and the purified material used in the preparation of the hydantoin. We prefer to utilize the crude mixture obtained by the hydration of dihydropyran as described above.

Thus, for example, there may be added to the crude mixture of hydration products ammonia and carbon dioxide or other compounds yielding ammonium ions and carbonate ions, for example, ammonium carbonate, and a compound yielding cyanide ions, for example, hydrogen cyanide or sodium cyanide. The reaction mixture may then be heated at temperatures of about 60 to 120° C. during several hours. The product, 5-(delta-hydroxybutyl) hydantoin, is then obtained by crystallization from the reaction mixture. Additional amounts of the product are obtained by partial vaporization followed by further crystallization.

It has also been discovered that the yield of 5-(delta-hydroxybutyl) hydantoin may in most instances be substantially increased by treatment with acid following completion of the reaction. It is believed that the increase in yield is due to conversion of an intermediate formed during the reaction to the desired product. Accordingly, in a preferred method of operating our invention, when the reaction to form the 5-(delta-hydroxybutyl) hydantoin is complete the reaction mixture is acidified with a strong mineral acid, preferably hydrochloric acid, and heated. The degree of heating is not critical but is preferably maintained at about 80° to 100° C. At lower temperatures the conversion is slow and no advantage is apparent in utilizing higher temperatures. About 1 to 3 hours is usually sufficient although longer or shorter periods of heating may be required depending upon the temperature. Strong acids other than hydrochloric may be used, for example, sulfuric acid. We prefer to use hydrochloric acid since this acid is economical, effective and has no adverse effect upon the product.

If desired, the product may first be recovered from the reaction mixture and the mother liquor subsequently treated with acid as described above.

The step in our novel process wherein delta-hydroxyvaleraldehyde or a crude mixture obtained by the hydration of dihydropyran which contains delta-hydroxyvaleraldehyde is reacted with a compound yielding carbonate ions, a compound yielding ammonium ions and a compound yielding cyanide ions is preferably carried out in an alkaline medium. If, for example, ammonium chloride, hydrogen cyanide and carbon dioxide are utilized it is preferred to add an alkali, for example, sodium hydroxide or sodium carbonate. However, it is not essential that alkaline conditions be utilized and neutral or slightly acid conditions may be utilized if desired although optimum results are obtained by utilizing an alkaline reaction medium.

We prefer to carry out the reaction at elevated temperatures. For example, temperatures within the range of about 40–150° C. In general, the best results are usually obtained when temperatures within the range of 60–120° C. are utilized. At temperatures lower than 40°, the reaction is very slow. At temperatures higher than 150° C., no advantage is found.

By compounds yielding cyanide ions, carbonate ions or ammonium ions is meant any compound which produces substantial amounts of the ions in solution. Thus, sodium cyanide and ammonium cyanide are examples of suitable compounds since these give substantial amounts of cyanide ions in solution whereas compounds such as ferrocyanides and copper cyanide do not yield substantial amounts of cyanide ions and are therefore unsuitable for the practice of our invention. Thus, instead of using sodium cyanide, potassium cyanide or hydrogen cyanide as the compound yielding cyanide ions other inorganic cyanides may be utilized. For example, alkaline earth metal cyanides such as barium cyanide or other cyanides which will yield cyanide ions in aqueous solution are suitable. Sodium cyanide or hydrogen cyanide are the preferred cyanide compounds since these materials are readily available at low cost and give high yields of desired product.

Likewise, in place of ammonium carbonate or ammonia and carbon dioxide, other compounds or combination of compounds which will yield carbonate ions and ammonium ions may be used. For example, ammonium chloride and carbon dioxide or ammonium carbamate may be utilized.

Although it is essential to satisfactory production of 5-(delta-hydroxybutyl) hydantoin that this step be carried out in an aqueous system it is not objectionable and in some instances may be desirable to have present solvents other than water. Thus, there may be utilized monohydric alcohols, for example, ethanol or butanol or polyhydric alcohols, for example, ethylene glycol. Other non-aqueous solvents may be used if desired. Usually it will not be desirable to use more than about 10% by weight of solvents other than water in the system although amounts up to 50% by weight may be present if desired.

As a convenient method to determine when the reaction to form 5-(delta-hydroxybutyl) hydantoin is complete a portion of the reaction mixture is titrated for ammonium hydroxide until successive titrations give constant results. The time required varies with reaction conditions. An alternative method for determining the end point of the reaction is to cool samples of the reaction mixture until successive samples show no increase in the amount of product precipitated.

The product, 5-(delta-hydroxybutyl) hydantoin, was found to contain the calculated percentage of nitrogen. By treatment with hydrochloric acid, it was converted to 5-(delta-chlorobutyl) hydantoin, analysis of which showed the calculated percentage of chlorine. The chlorobutyl hydantoin, on treatment with ammonia, yielded 5-(delta-aminobutyl) hydantoin. The latter was isolated as the hydrochloride, which contained the calculated quantity of ionizable chlorine. Hydrolysis of the aminobutyl hydantoin yielded lysine, which has been isolated as the dihydrochloride, and as the monohydrochloride. Each of these compounds had the correct melting point and ionizable chlorine content. Feeding tests showed these products to have the predicted biological activity when added to a lysine-deficient diet.

As further confirmation of its identity, 5-(delta-hydroxybutyl) hydantoin, was hydrolyzed with hydrochloric acid. The product, alpha - amino - epsilon - chlorocaproic acid was identical with that obtained by similar treatment of 5-delta-chlorobutyl) hydantoin, and was identified by analysis for nitrogen content. When treated with ammonia, the amino-chlorocaproic acid yielded pipecolinic (piperidine-alpha-carboxylic) acid.

The 5-(delta-hydroxybutyl) hydantoin obtained as described above is then reacted with hydrogen chloride or hydrogen bromide, preferably at elevated temperatures, to obtain 5-(delta-chlorobutyl) hydantoin or 5-(delta-bromobutyl) hydantoin.

Thus, in the second step of our process, we may proceed by passing hydrogen chloride into contact with 5-(delta-hydroxybutyl) hydantoin heated to a temperature sufficiently high to provide a liquid reaction medium. Small amounts of water or other suitable material may be added to the hydroxy hydantoin to lower the melting point. The reaction mixture is preferably well agitated and is heated in contact with hydrogen chloride until the melting point of a sample of the product reaches the correct value or does not rise with continued treatment. The reaction usually requires about 1 to 10 hours depending upon the reaction conditions.

In one embodiment hydrogen chloride is passed into contact with 5-(delta-hydroxybutyl) hydantoin in the presence of water. The amount of water utilized should not be more than about 50% by weight of the reaction mixture since in the presence of greater amounts of water undesirable hydrolysis of the product may occur. In general sufficient water is utilized to lower the melting point of the reaction mixture to the desired temperature of operation or slightly lower. Usually about 10 to 20% water is sufficient.

In a preferred method of carrying out the reaction, a reaction medium comprising a mixture of 5-(delta-hydroxybutyl) hydantoin and 5-(delta-chlorobutyl) hydantoin is used as the best yields are obtained in this manner and isolation of the product is simplified. The concentration of chlorobutyl hydantoin present is not critical and will vary as the reaction proceeds. Preferably sufficient 5-(delta-chlorobutyl) hydantoin is utilized so that the reaction mixture is liquid at the preferred operating temperatures. It is satisfactory to use equal weights of chlorobutyl hydantoin and hydroxybutyl hydantoin.

We prefer to operate this step of our invention at elevated temperatures and temperatures of 75° to 200° C. are suitable. Preferably, we utilize temperatures within the range 115° to 135° C. for best results. At temperatures below 75° C. the reaction is slow while at temperatures about 200° C. decomposition may occur with resultant contamination of the product.

The reaction may be carried out at atmospheric pressures with excellent results. However, if it is desired further to accelerate the reaction pressures greater than atmospheric may be utilized. Pressures of less than atmospheric may also be utilized if desired.

Although it is preferred to utilize gaseous hydrogen chloride or hydrogen bromide, these gases may be replaced in part by aqueous solutions as long as the total amount of water present in the reaction mixture does not exceed 50% by weight.

If desired, catalysts may be used. Examples of suitable catalysts are catalysts of the amine salt type and quaternary ammonium compounds as illustrated by pyridine, quinoline, tetramethyl ammonium chloride and trimethyl benzyl ammonium chloride.

The amine salts which are suitable are those compounds having the following general formula:

wherein each R substituent is hydrogen or an alkyl or aralkyl radical, Y is an alkyl radical and X is either chlorine or bromine. The preferred catalysts of this type are those amine salts which are aliphatic compounds in which at least two of the R substituents in the above general formula are alkyl radicals. That is, the preferred catalysts of this class are the aliphatic tertiary amine hydrochlorides and amine hydrobromides and the tetraalkyl quaternary ammonium chlorides and bromides.

The use of catalysts permits effective operation at lower temperatures. We have found, for example, that the best results are obtained using pyridine as catalyst at temperatures of about 90° to 100° C. instead of the preferred temperatures of 115° to 135° C. when operating the non-catalytic process. The reaction is also more rapid when a catalyst is used. In general, it is preferred to utilize an amount of catalyst which is about equal to the weight of the 5-(delta-hydroxybutyl) hydantoin. Smaller quantities may be used but for effective results at least 10% by weight based on the amount of 5-(delta-hydroxybutyl) hydantoin should be present. Amounts of catalysts greater than an equal weight may be utilized but without any apparent advantage. When utilizing catalysts of the types described above, it is desirable to have present sufficient water to maintain the hydrochlorides in solution. A slight excess of water may be present but it is necessary for best results to avoid a concentration of water greater than 50% by weight of the reaction medium.

Although the utilization of catalysts in the operation of the second step of our invention is effective in increasing the reaction rate and decreasing the temperature required, it is preferred to utilize a non-catalytic process utilizing a mixture of 5-(delta-hydroxybutyl) hydantoin and 5-(delta-chlorobutyl) hydantoin as the reaction medium since excellent results are thus obtained and the problem of separating and recovering a catalyst is avoided.

It is to be understood that although in the foregoing description reference is made to the preparation of 5-(delta-chlorobutyl) hydantoin, 5-(delta-bromobutyl) hydantoin is also included within the scope of this invention. The 5-(delta-bromobutyl) hydantoin is prepared in the same manner as 5-(delta-chlorobutyl) hydantoin by utilizing hydrogen bromide in the place of hydrogen chloride as described above.

Analyses of the products showed the chlorine and bromine contents to be in close agreement with the theoretical values. A recrystallized sample of 5-(delta-chlorobutyl) hydantoin was found to contain 18.47% chlorine. The calculated value for the compound is 18.60% chlorine. A sample of the 5-(delta-bromobutyl) hydantoin analyzed 33.8% bromine whereas the calculated value is 34.1%.

Both the bromo and the chloro compounds are soluble in hot water, methanol or ethanol and are sparingly soluble in these solvents cold. They are insoluble in most organic solvents, for example, ethers, hydrocarbons and halogenated hydrocarbons. The compounds dissolve in aqueous alkalies and may be reprecipitated by acidification.

The identity of these halobutyl hydantoins was further confirmed by conversion of 5-(delta-chlorobutyl) hydantoin to 5-(delta-aminobutyl) hydantoin by treatment with ammonia. The aminobutyl hydantoin was isolated as the hydrochloride which contained the calculated quantity of ionizable chlorine. The aminobutyl hydantoin was hydrolyzed to yield lysine which was isolated as the dihydrochloride and the mono-hydrochloride. Each of these compounds had the correct melting point and ionizable chlorine content.

The 5-(delta-halobutyl) hydantoin obtained as described above may be converted to lysine by reaction with a quaternary ammonium, alkali metal or alkaline earth metal base, condensing the hydantoin salt thus obtained to form poly-3,5-tetramethylene hydantoin and hydrolyzing the latter as described below.

Any of the quaternary ammonium, alkali metal or alkaline earth metal bases may be utilized to form the hydantoin salt. Among the alkaline earth metal bases which are satisfactory are calcium hydroxide, barium hydroxide, calcium hydride, calcium carbide, calcium carbonate, barium carbonate and magnesium carbonate; alcoholates of alkaline earth metals, for example, calcium methylate and barium butylate; strontium hydroxide, magnesium hydroxide and magnesium oxide.

As used throughout this specification and in the appended claims the term alkaline earth bases is intended to include magnesium bases.

Quaternary ammonium bases which may be utilized include, for example, trimethyl ethyl ammonium hydroxide, benzyl trimethyl ammonium hydroxide, tetramethylammonium hydroxide, tetraethylammonium hydroxide, methyl or ethyl pyridinium hydroxide, cetyl pyridinium hydroxide, trimethyl cetyl ammonium hydroxide, trimethyl phenyl ammonium hydroxide and the corresponding alkoxides.

The preferred bases are the alkali metal bases. For example, among the alkali metal bases utilized successfully are sodium hydroxide, sodium hydride, sodium amide, sodium methylate, sodium carbonate, sodium isobutylate and potassium carbonate. The corresponding compounds of lithium, rubidium, caesium and other potassium compounds may likewise be used. However, in general, it is preferred to use sodium or potassium bases as these are more readily available and economical to use.

The hydantoin salt may be obtained by mixing chlorobutyl or bromobutyl hydantoin with the desired base. For example, the operation may be carried out by heating the two materials to the fusion temperature of the hydantoin or the reaction may be carried out in the presence of a solvent. For example, chlorobutyl hydantoin may be mixed with a solution of sodium isobutylate in isobutanol or other suitable solvent and heated to reflux temperature in order to obtain a maximum concentration of reactants. The reaction is rapid and is usually substantially complete within a few minutes. The hydantoin salt may be isolated by cooling and crystallization from the solvent. If desired the base and the halobutyl hydantoin may be heated in the presence of a small amount of solvent sufficient only to impart fluidity to the mixture.

Any solvent compatible with the reactants may be utilized. Various alcohols, for example, isobutanol, n-butanol, isopropyl or amyl alcohol are satisfactory. Likewise water, methanol, ethylene glycol monomethyl ether, tetrahydrofurfuryl alcohol, ammonia and dimethyl formamide may be used.

The degree of heating is in general not critical. At room temperature the reaction to produce the hydantoin salt is very rapid when intimate contact of reactants is obtained, for example, when a solvent is utilized. When one of the reactants is brought into fluid condition by heating at or above the melting point the reaction is also very rapid. In general it is desirable to heat the solvent in order to obtain maximum concentration of reactants. When the reaction is carried out in the absence of a solvent with a dry base such as sodium carbonate the dry mixture may be heated to the fusion temperature of the hydantoin. At temperatures above the fusion temperature of the hydantoin formation of the hydantoin salt is very rapid and as further described below the product may be converted to poly-3,5-tetramethylene hydantoin.

The hydantoin salt prepared as described above may be readily converted to poly-3,5-tetramethylene hydantoin by heating the dry hydantoin salt. By heating the salt at a temperature somewhat below the melting point a slow conversion to the polymeric compound occurs. When the temperature is raised to the melting point of the salt in the absence of added solvent formation of the polymer is almost instantaneous and is accompanied by strong heat evolution.

The condensation to form the polymer may be effected at a satisfactory rate at temperatures below the melting point of the hydantoin salt by the addition thereto of small amounts of a solvent. For example, when a small quantity of dimethyl formamide, e. g. an amount sufficient to wet the hydantoin salt, is added to the hydantoin salt and the mixture is heated, rapid reaction occurs at about 105 to 110° C., the temperature rises within a few seconds to about 170° C. and the formation of poly-3,5-tetramethylene hydantoin is substantially complete.

The temperature may be controlled by dilution with inert solvents and the time required for completion of the reaction will vary with the degree of dilution and heating. We have discovered that when the solvent utilized is liquid ammonia the reaction proceeds at a fair rate at room temperature. However, in general it is not necessary to utilize a solvent and except in special cases where it is desired to operate at low temperatures, such as may be employed with liquid ammonia as solvent, heating the hydantoin salt to a temperature sufficient to initiate the exothermic reaction is satisfactory and simplifies isolation of the product. In general it is preferred to carry out the condensation reaction at temperatures within the range of 100 to 200° C. Below 100° C. the reaction is slow unless a solvent is utilized. Above about 200° C. no advantage is found since the reaction is substantially complete within a few seconds at the latter temperature.

Although the sodium chlorobutyl hydantoin or other hydantoin salt may be isolated and subsequently condensed to the polymer as described above our preferred method is to carry out the formation of the hydantoin salt and condensation to poly-3,5-tetramethylene hydantoin in a single operation without isolation of the salt.

Thus, we may proceed by forming the hydantoin salt as above described and continue heating at elevated temperatures until conversion to the polymer is complete as measured by a determination of the ionizable chlorine content of the product. The reaction may be carried out with or without a solvent present. For example, the polymer may be obtained by heating sodium hydroxide or other base and chlorobutyl or bromobutyl hydantoin in water at the boiling point. The operation may also be carried out in solvents other than water, for example, the solvents previously described for use in the preparation of the hydantoin salt. For example, the polymer has been obtained by reacting sodium ethylene glycol monomethyl ether and chlorobutyl hydantoin in ethylene glycol monomethyl ether at the boiling point.

However, since many suitable bases such as sodium hydroxide or sodium alcoholates in hydroxylic solvents are capable of reacting with the halogen of the halobutyl hydantoin to produce compounds which cannot be converted to lysine, the preferred method is to operate in the absence of a solvent. A preferred method of operation is to heat a dry mixture of the halobutyl hydantoin and a base, for example, sodium or potassium carbonate. At the melting point of the hydantoin, which is about 128° C. for both chlorobutyl and bromobutyl hydantoin, the hydantoin salt is formed and simultaneously autocondensation to form poly-3,5-tetramethylene hydantoin begins. In order to accelerate the latter reaction the temperature is preferably raised to about 160° C. or higher. The initial mixture should be stirred to insure adequate contact between the hydantoin and base. As formation of polymer progresses the mixture becomes increasingly viscous and difficult to stir. Although stirring is no longer necessary at this point the tendency of the polymer to solidify can be overcome if desired by the addition of a small amount of solvent for the polymer, for example, dimethyl formamide or tetrahydrofurfuryl alcohol. Adding sufficient solvent to cause the mass to remain fluid is satisfactory.

The rate of polymer formation and the yield of lysine obtainable by hydrolysis of the polymer are affected by the particular composition of the mixture utilized. For example, the reaction between the halobutyl hydantoin and sodium or potassium carbonate theoretically requires one half mole of the carbonate for each mole of hydantoin. We have discovered that when sodium carbonate is used a marked improvement in reaction rate and yield of lysine is obtained by employing a relatively large excess of the carbonate, for example, a 1 to 1 molar proportion and it is accordingly preferred to utilize at least 1 mole of sodium carbonate for each mole of hydantoin. On the other hand, we have found that in general a slight excess of the base to insure complete reaction is satisfactory but no advantage is gained by utilizing a large excess as is the case when sodium carbonate is employed as the base. For example, when using potassium carbonate we have found that the rate of reaction and yield of lysine are not improved by the use of a large excess, a molar proportion of 0.6 mole of potassium carbonate giving equally as good results as 1 mole.

The rate of reaction is increased if a small amount of solvent is present. When sufficient solvent is added to prevent solidification of the polymer the reaction may be completed at a lower temperature, for example, at 135 to 140° C. in the same length of time required at 160 to 170° C. in the absence of added solvent.

The by-product sodium chloride or other salt formed together with any excess base present may be removed from the polymer by extracting with water.

When the product mixture contains sodium chloride as by-product it is advantageous to extract the polymer with water containing a slight excess of acid over that required to neutralize the alkali present. Increased yields of polymer in the order of 10 to 15% are obtained when acid is utilized. Water soluble acids stronger than sodium bicarbonate, the sodium salts of which are soluble in water, for example, hydrochloric, acetic, phosphoric and hydrobromic acids are suitable. Hydrochloric acid is preferred as it is cheap and readily available and the sodium chloride formed is inocuous. Since the solubility of the polymer increases with increased temperature the extraction preferably is carried out at room temperature. However, temperatures from 0° to 100° C. may be utilized if desired.

The structure of the polymer, poly-3,5-tetramethylene hydantoin is believed to be that represented by the following formula:

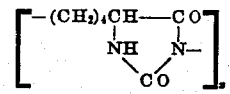

wherein $x$ is an integer. This structure is deduced from the mode of formation of the polymer and is confirmed by the fact that upon hydrolysis lysine is obtained in very high yields. The properties of the polymer depend upon its molecular weight which in turn is determined by the extent of polymerization. The product ordinarily obtained is a brittle solid at ordinary temperatures, is thermoplastic and has an indefinite melting point. Filaments of the polymer may be pulled when it is softened by heat. It is substantially insoluble in most ordinary solvents but is soluble in dimethyl formamide, ethylene glycol monomethylether and tetrahydrofurfuryl alcohol and in strong acids and alkalies. Poly-3,5-tetramethylene hydantoin is slightly soluble in water and is sufficiently permeable thereto that sodium chloride formed as a by-product in the condensation may readily be completely extracted by washing with water.

Poly-3,5-tetramethylene hydantoin may be hydrolyzed to lysine by treatment with water or aqueous ammonia but the reaction is slow. The hydrolysis may be carried out more rapidly utilizing an acid or base. Strong acids such as hydrochloric acid, hydrobromic acid or sulfuric acid may be used. If it is desired to utilize a base, the alkali and alkaline earth hydroxides are particularly suitable and the alkali metal hydroxides are preferred due to greater reactivity and greater solubility in water.

The minimum amounts of acid or base which should be used for best results in effecting hydrolysis are the stoichiometric equivalents. Thus, each molecular unit of the polymer requires two moles of hydrochloric acid or the equivalent thereof of other acids. Three moles of sodium hydroxide or the equivalent of other base are likewise necessary. Similarly at least two moles of water are required for each unit of polymer. The product is usually isolated as the lysine salt, for example, as the dihydrochloride or the monohydrochloride.

Preferably an excess of acid or base is utilized in the hydrolysis, for example, 10% to 100% in excess of the stoichiometric requirement together with a large excess of water. It is preferred to use hydrochloric acid or sodium hydroxide as the hydrolyzing agent although other acids or bases may be utilized if desired.

Since lysine is conveniently isolated as the dihydrochloride and may be utilized as such for some purposes, it may be desired to utilize hydrochloric acid as the hydrolyzing agent. Thus the hydrolysis may be carried out in 3 to 4 hours by treatment with constant boiling hydrochloric acid utilizing about 4 moles of acid per unit of hydantoin polymer at about 180° C. Pressure equipment capable of withstanding the pressure developed by the formation of carbon dioxide must be used or venting of the carbon dioxide must be provided in order to obtain complete hydrolysis within a relatively short period. At atmospheric pressure, at boiling temperature the hydrolysis requires 30 hours or more.

In like manner when utilizing aqueous sodium hydroxide or other base it is preferred to operate at a pressure sufficient to obtain the desired temperature in order to minimize the time required.

Acidic hydrolysis temperatures within the range 120 to 250° C. are most suitable. When alkaline hydrolysis is used it is preferred to operate within the range 100° to 200° C. for best results. Neither temperature nor pressure is critical and may be chosen with respect to the time desired for completion of the reaction.

The progress of the hydrolysis may be roughly followed by a determination of the amount of carbon dioxide evolved or by periodic determination of the yield of lysine.

Excess acid may be distilled from the product mixture and reutilized. The lysine may then be isolated by known methods for isolation of amino acids. For example, lysine dihydrochloride may be obtained by extracting the residue after distillation of acid with methanol or ethanol and adding a liquid non-solvent such as acetone or ether to precipitate the dihydrochloride.

If desired the alcoholic solution may be treated with pyridine or aniline to precipitate lysine monohydrochloride. The products of basic hydrolysis are worked up in a similar manner after acidification.

For some uses the crude product of hydrolysis may be used directly after excess acid has been distilled off thus avoiding the necessity for conversion to the monohydrohalide salt. On the other hand it is also possible to resolve the racemic mixture by known methods to obtain the biologically active L(+)-lysine in any desired degree of purity. Thus the biologically inactive D(−)-isomer may be racemized and converted entirely to the active form.

The following examples illustrate our invention:

Example 1

One mole (102 g.) of distilled delta-hydroxyvaleraldehyde was mixed with 1 mole (27 g.) of liquid hydrogen cyanide. Four moles (270 cc.) of concentrated ammonium hydroxide were saturated with carbon dioxide while heating to 56° C. The aldehyde-hydrogen cyanide mixture was run in gradually (1 hour), and the mixture heated under a carbon dioxide atmosphere with stirring for 5 hours. The solution was evaporated to about 100 cc., cooled to crystallize the product and filtered. The product was recrystallized twice from 95% ethanol, decolorizing with charcoal. The purified product (19.5 g.) melted at 151-2° C. Analysis by the Kjeldahl method showed 16.0% N (calculated 16.3%).

5-(delta-hydroxybutyl) hydantoin (0.125 mole, 23.8 g.) was placed in a test tube and heated in an oil bath until melted. Hydrogen chloride gas was fed in for 5 hours, holding the temperature at approximately 160-175° C. The product was poured into 100 cc. of water, dissolved by heating and cooled to crystallize. After drying, the resulting crystals of 5-(delta-chlorobutyl) hydantoin weighed 19.7 g. (82.5 of theoretical yield) and melted at 122-123° C.

5-(delta-chlorobutyl) hydantoin prepared by a similar procedure was treated as follows: Sodium (1 g.-atom, 23 g.) was disolved in 1 liter of dry isobutanol at the boiling point and mixed with a solution of 1.02 moles (194 g.) of chlorobutyl hydantoin in hot (90° C.) isobutanol. A vigorous evolution of heat occurred on mixing, and precipitation of the sodium derivative of chlorobutyl hydantoin began immediately. After cooling to 8°, the product was filtered off, washed with cold isobutanol and dried under reduced pressure. The average yield from three runs was 98%.

A 1 liter Erlenmeyer flask was immersed in an oil bath at 168° C., and 0.2 mole (42.5 g.) of sodium chlorobutyl hydantoin placed in the hot flask. When the temperature of the charge reached 150-155° (about 8 minutes), the material fused and a vigorous reaction set in. The flask was immediately removed from the oil bath. Reaction appeared to be complete in about ½ minute, during which the charge swelled to a spongy mass. The chloride ion content of the product mixture was 16.85% (theory 16.7%).

The polymer obtained by a similar procedure was hydrolyzed by heating during several hours with aqueous hydrochloric acid followed by evaporation to dryness. The residue was dissolved in hot ethanol and treated with pyridine. Lysine monohydrochloride was obtained as a precipitate after standing several hours.

Example 2

Dihydropyran (4.56 moles, 383.5 g.) was stirred with 1 liter of water and 20 cc. 1 N hydrochloric acid in a water bath at 40° C. until a clear solution was obtained. The mixture was cooled and the flask swept with carbon dioxide. Hydrogen cyanide (4.15 moles, 167 cc.) was added and 28% aqueous ammonia (4.56 moles, 304 cc.) added dropwise over a 2 hour period while stirring vigorously under a carbon dioxide atmosphere. The temperature rose to 48° maximum during the addition of the ammonia and was afterward held at 50-60° for about 12 hours. Stirring under carbon dioxide was continued throughout the heating period. On cooling to 5-10° C., a crop of 5-(delta-hydroxybutyl) hydantoin weighing 324 g. (45.2% of theoretical yield) and melting at 149-151° C. was obtained. By evaporating the mother liquor an additional 184 g. of less pure product was obtained. Total yield 71% of theoretical.

A mixture of 1 mole (172 g.) 5-(delta-hydroxybutyl) hydantoin and 25 cc. water was heated at approximately 115-120° C. while stirring and feeding hydrogen chloride gas for 6½ hours. The product was poured into hot water and cooled to crystallize; 159 g. (83.4% of the theoretical yield) of 5-(delta-chlorobutyl) hydantoin, melting at 123-124° C. was obtained.

5-(delta-chlorobutyl) hydantoin (1.69 moles, 321 g.) and sodium carbonate (1.69 moles, 179 g.) were placed in a 1 liter stainless steel beaker equipped with a paddle stirrer and heated in an oil bath as follows:

| Time | Bath Temp. | Remarks |
| --- | --- | --- |
|  | Degrees |  |
| 0 | 20 | Heat and Stirrer on. |
| 15 min | 105 |  |
| 20 min | 135 |  |
| 30 min | 135 | Mixture melted, considerable foaming. |
| 40 min | 140 |  |
| 50 min | 148 | Foaming subsided. |
| 55 min | 150 | Asbestos cover on beaker. |
| 1 hr | 160 |  |
| 1 hr. 5 min | 166 |  |
| 1 hr. 15 min | 169 |  |
| 1 hr. 35 min | 169 | Too thick to stir. |
| 2 hr. 10 min | 170 |  |
| 2 hr. 30 min | 171 |  |
| 3 hrs | 170 | Breaker removed from oil bath. |

The product mixture (452 g.) contained 12.25% chloride ion (93% of theoretical). One mole (268 g.) was ground in a mortar and extracted overnight with stirring with 350 cc. water and 95 cc. conc. HCl. After filtering and reslurrying with 265 cc. of water, the solid contained 1.9% NaCl, and weighed 150 g. A similar extraction of the remainder of the polymer gave a product containing 0.43% NaCl.

Four Carius tubes were charged with identical mixtures as follows: Poly-tetramethylene hydantoin (extracted product prepared as described above) 0.075 mole (11.57 g.); conc. HCl 0.30 mole (25 cc.); water 24.5 cc. The tubes were sealed and heated at 180–185° C. for periods of 2, 3, 4 and 5 hours. The contents of each tube were evaporated to dryness, and the residue dissolved in 95 cc. of hot 95% ethanol and treated with 7.5 g. pyridine. After standing overnight, the precipitated lysine monohydrochloride was filtered off, dried and weighed. Results were as follows:

| Tube No. | Heating period | Yield based on polymer | Yield based on chlorobutyl hydantoin |
|---|---|---|---|
| | Hours | Percent | Percent |
| 1 | 5 | 78 | 76 |
| 2 | 4 | 78 | 76 |
| 3 | 3 | 78 | 76 |
| 4 | 2 | 67 | 65 |

Example 3

Six liters of water containing 13 cc. concentrated hydrochloric acid was heated to 60° C., and 25 moles (2100 g.) of dihydropyran added gradually with stirring under a reflux condenser. When the solution was clear it was neutralized with 17 g. (0.2 mole) of sodium bicarbonate and cooled in ice water. Hydrogen cyanide (25 moles, 1010 cc.) was added and the solution transferred to a 5 gallon stainless steel vessel previously charged with 3 kg. of ammonium carbonate. The mixture was heated for 3¾ hours, reaching a maximum temperature of 109° C. and pressure of 102 lbs. per square inch. On cooling, 1623 g. of 5-(delta-hydroxybutyl) hydantoin, M.P. 152–3° crystallized. By successive evaporation and crystallization, a second crop of 531 g. (M.P. 148–150.5°) and a third impure crop of 255 g. were obtained. Total yield was 56% of theoretical.

A mixture of 5-(delta-hydroxybutyl) hydantoin (2 moles; 344 g.) and 5-(delta-chlorobutyl) hydantoin (344 g.) was heated to fusion by means of an oil bath, and hydrogen chloride was fed with stirring at 130–140° C. for 6.8 hours. Samples were removed periodically for melting point determination to follow the course of the reaction. These gave the following results:

| Time, hours | M. P. of mixture, °C. |
|---|---|
| 1.3 | 100–105 |
| 2.0 | 115–118 |
| 2.6 | 118–121 |
| 3.5 | 121–123 |
| 5.5 | 125–127 |
| 6.4 | 125–127 |
| 6.8 | 125–127 |

As indicated by the above results, the reaction was complete in 5½ hours; the yield was substantially quantitative.

Chlorobutyl hydantoin (0.2 mole, 38.1 g.) and potassium carbonate (0.12 mole, 16.6 g.) were placed in a 400 cc. beaker fitted with a stirrer and heated in an oil bath as follows:

| Time | Bath Temp. | Remarks |
|---|---|---|
| | Degrees | |
| 0 | 25 | Heat on; stirred manually. |
| 15 min | 135 | |
| 20 min | 135 | Mixture melted, stirrer on. Much $CO_2$ evolution and foaming. |
| 30 min | 140 | Foaming subsided. Asbestos cover on beaker. |
| 40 min | 160 | |
| 45 min | 170 | |
| 1 hr | 170 | |
| 1 hr. 45 min | 165 | Stirring off (not to viscous to stir). |
| 2 hr | 170 | |
| 2 hr. 20 min | 168 | Beaker removed from bath. |

The product (48.6 g.) contained 13.3% chloride ion (91% of theoretical). Hydrolysis of the product with conc. HCl yielded 72% of the theoretical lysine monohydrochloride, based on chlorobutyl hydantoin.

Example 4

Dihydropyran (3 moles, 252 g.), water (600 cc.) and hydrochloric acid (15 cc. of 1 N) were stirred together until the dihydropyran was dissolved. The solution was cooled and the flask swept with carbon dioxide. A solution of 3 moles (153 g.) of sodium cyanide in 360 cc. water was added slowly with stirring under carbon dioxide. Ammonium hydroxide (3.3 moles, 220 cc.) was added rapidly and stirring under carbon dioxide continued at 50–60° C. for 5 hours and at 40–45° C. overnight. The mixture was cooled and acidified with 310 cc. concentrated hydrochloric acid. Two hundred and seventy grams of pure 5-(delta-hydroxybutyl) hydantoin crystallized directly. A second crop containing 26.2 g. of the hydantoin mixed with sodium chloride was obtained by evaporating the mother liquor. The total yield was 57.2% of theoretical.

Pyridine (50 g.) was saturated with hydrogen chloride gas and mixed with 0.5 mole (86 g.) of 5-(delta-hydroxybutyl) hydantoin. The mixture was heated in an oil bath and hydrogen chloride fed with stirring for 2 hours at approximately 125–130° C. The product was crystallized from 200 cc. water, to yield 90.3 g. (94.8% of theoretical) of 5-(delta-chlorobutyl) hydantoin, melting at 127–128° C.

Chlorobutyl hydantoin (0.20 mole; 38.1 g.) and sodium carbonate (0.20 mole, 21.2 g.) were mixed in a 400 cc. beaker fitted with a stirrer and heated in an oil bath as follows:

| Time | Bath Temp. | Remarks |
|---|---|---|
| | Degrees | |
| 0 | 70 | Beaker placed in bath, stirred manually. |
| 15 min | 135 | |
| 20 min | 135 | Mixture melted. Stirrer started. Beaker covered with asbestos. |
| 30 min | 139 | |
| 40 min | 137 | |
| 50 min | 137 | 20 cc. dimethyl formamide added. |
| 1 hr | 137 | 5 cc. dimethyl formamide added. |
| 1 hr. 15 min | 137 | 5 cc. dimethyl formamide added. |
| 1 hr. 30 min | 138 | 10 cc. dimethyl formamide added. |
| 1 hr. 35 min | 138 | 10 cc. dimethyl formamide added. |
| 1 hr. 50 min | 137 | 5 cc. dimethyl formamide added. |
| 2 hr. 5 min | 136 | 5 cc. dimethyl formamide added. |
| 2 hr. 20 min | 140 | Heat off. |
| 2 hr. 25 min | 126 | Beaker removed from bath. |

The product mixture (64.9 g.) contained 10.3% chloride ion (94% of theoretical). Hydrolysis with conc. HCl at 150° yielded 74% of the theoretical lysine monohydrochloride.

Example 5

Distilled water (600 cc.) was acidified with 15 cc. 1 N hydrochloric acid and heated to 70° C. Dihydropyran (1 mole, 84 g.) was added and the mixture stirred until the dihydropyran dissolved (45 min.). The solution was neutralized with 1.5 g. sodium bicarbonate and cooled to room temperature. Crude commercial calcium cyanide (24% CN, 84 g.) was added, and the flask swept with carbon dioxide. The mixture was held at approximately 60° C. while stirring under carbon dioxide for 2 hours, then digested overnight at approximately 40° C. under carbon dioxide without stirring. The mixture was again heated to 65° C. and filtered to remove calcium carbonate along with insoluble impurities originally present in the calcium cyanide. The filtrate was evaporated to 200 cc. and cooled to crystallize the product. The latter, when washed and dried, melted at 151–152° C. and weighed 27 g. The mother liquor was acidified with 30 cc. concentrated hydrochloric acid and heated on the steam bath overnight. On cooling, an additional 8.9 g. of hydroxybutyl hydantoin, M. P. 146–147°, precipitated. Total yield 35.9 g. (21% of theoretical).

Example 6

A solution of 12 cc. 1 N hydrochloric acid in 600 cc. water was heated to 50° C., and 3 moles (252 g.) dihydropyran added. The mixture was stirred until the dihydropyran had dissolved (23 min.), then neutralized with 1.5 g. sodium bicarbonate and cooled to 15° C. Liquid hydrogen cyanide (3 moles, 120 cc.) was added, the air displaced from the reaction flask with carbon dioxide, and 4 moles (270 cc). concentrated ammonium hydroxide added gradually with stirring (¾ hour). The mixture was heated at 50° C. with stirring under an atmosphere of carbon dioxide until successive titrations for ammonium hydroxide gave constant results (9 hours). The temperature of the mixture was raised sufficiently to dissolve the hydantoin which had precipitated at this point, and the solution divided into two equal parts, which were treated as follows:

a. One portion of the solution was cooled to 15° C., and filtered; the crop of delta-(hydroxybutyl) hydantoin thus obtained weighed 107 g. and melted at 151–151.5° C. An additional 55.8 g., M. P. 140–143° C., was obtained by evaporating the mother liquor and crystallizing from methanol. No additional crystalline product could be recovered from the final mother liquor. The total yield from this portion of the reaction mixture was 162.8 g. (63.2% of the theoretical).

b. The second portion was boiled to expel excess ammonia, acidified with 10 cc. concentrated hydrochloric acid and heated on the steam bath for one hour, at which time it was found to be only faintly acidic. An additional 10 cc. concentrated hydrochloric acid was added, and heating continued for 2 hours (total heating time 3 hours). The solution was cooled and filtered, yielding 180 g. 5-(delta-hydroxybutyl) hydantoin, M. P. 146–148° C. Additional crops of 8 g. (M. P. 140–143°) and 3 g. (M. P. 146–148° C.) were obtained by successive evaporation and crystallization. The total yield from this portion of the reaction mixture was 191 g. (74% of theoretical).

Example 7

Poly-tetramethylene hydantoin was prepared as described in Example 2, from 3 moles chlorobutyl hydantoin and 3 moles sodium carbonate. The product, which contained 93% of theoretical chloride ion, was treated as follows: A 0.1 mole sample was hydrolyzed with conc. HCl in two portions, which gave 73% and 74% yields of lysine monohydrochloride. The main portion of the polymer (746 g.=2.78 moles) was dissolved in a solution of 556 g. (13.9 moles) of sodium hydroxide in 2900 cc. of water, and charged to a 5 gal. stainless steel autoclave. The mixture was heated at 125–126° C. for 41 hours, mainly without stirring. The maximum gauge pressure was 31 p. s. i. Samples were removed after 17, 24 and 41 hours' reaction time, and worked up to determined yields of lysine. The recovery procedure used in each case was as follows: The basic solution was partially evaporated under reduced pressure, then treated with excess HCl and evaporated to dryness, filtering off sodium chloride periodically as necessary. The residue was extracted with hot 95% ethanol, the solution filtered and treated with a slight excess of pyridine to precipitate lysine monohydrochloride. Yields were as follows:

| Sample | Hydrolysis Time | Moles Theor. lysine in spl. | Weight of lysine monohydrochloride | Yield |
| --- | --- | --- | --- | --- |
|  | Hours |  |  | Per cent |
| A | 17 | 0.163 | 21.6 | 72 |
| B | 24 | 0.162 | 22.8 | 77 |
| C | 41 | 0.179 | 24.8 | 76 |
| Main Batch | 41 | 2.28 | 298 | 71 |
| Total |  | 2.78 | 367 | 72 |

Example 8

The crude product from the hydrolysis of 0.075 mole of poly-tetramethylene hydantoin with HCl was evaporated to dryness under reduced pressure and the residue dissolved in 38 cc. of hot methanol. The solution was filtered to remove sodium chloride. Isopropylamine was added gradually until the pH of the solution was 4.7–4.8. The precipitated lysine monohydrochloride, after filtering and drying, weighed 11.58 g. (84.7% of theory, based on polymer, 82% based on chlorobutyl hydantoin), and contained 20.3% chloride ion.

Example 9

One mole (190.5 g.) of chlorobutyl hydantoin was dissolved in 300 cc. of boiling ethylene glycol monomethyl ether and mixed with a solution of 1 g. atom (23 g.) of sodium in 300 cc. ethylene glycol monomethyl ether. The solution was boiled under reflux for 1½ hours, and the solvent then distilled off at atmospheric pressure. The residue was a brown resin, weighing 207 g. A 100 g. aliquot of the latter was divided among 4 glass pressure tubes, each containing 35 cc. of conc. hydrochloric acid, and hydrolyzed by heating for 17 hours at 150° C. The contents of the tubes were evaporated to dryness under reduced pressure, the residue dissolved in 95% ethanol and pyridine added to precipitate lysine monohydrochloride. The crude product, obtained in 38% yield, melted at 248° C. and contained 18.8% chloride ion.

Example 10

A mixture of chlorobutyl hydantoin (0.5 mole), sodium bicarbonate (0.6 mole) and water (600 cc.) was heated overnight on the steam bath; analysis for chloride ion showed the reaction to be 93% complete the following morning. The mixture was evaporated to a thick slurry, which was divided among four glass pressure tubes each containing 50 cc. of conc. HCl and hydrolyzed by heating for 8 hours at 150° C. The resulting lysine was recovered as the monohydrochloride by evaporating to dryness, extracting the residue with ethanol and precipitating with pyridine. The yield of crude lysine monohydrochloride was about 9%.

Example 11

A mixture of chlorobutyl hydantoin (0.2 mole, 38.1 g.) and calcium carbonate (0.1 mole, 10 g.) was heated in an oil bath with stirring to approximately 200° C. (bath temperature) and held at this temperature for about 1 hour. A noticeably exothermic reaction set in at about 185°, and the mixture gradually thickened until it was barely stirrable. Analysis of the cooled polymer showed 85.1% of the theoretical ionizable chlorine. A 43 g. aliquot of the polymer was hydrolyzed with conc. HCl at 165–180° C., and the resulting solution evaporated to dryness under reduced pressure. The residue was extracted with 95% ethanol, and the solution treated with pyridine to precipitate 19.5 g. of crude lysine monohydrochloride. The latter was recrystallized by dissolving in 25 cc. water and adding 200 cc. methanol, whereby 11.3 g. of purified product (M. P. 250–256° C.; chloride ion 19.26%) was obtained. Ten grams of material of undetermined composition which remained undissolved during the alcohol extraction was similarly dissolved in water and the solution diluted with methanol, to yield an additional 4.5 g. of lysine monohydrochloride, M.P. 251–254°, ionizable chlorine 19.2%. The total yield was 15.8 g. (43% of theoetrical).

Example 12

A mixture of chlorobutyl hydantoin (0.2 mole, 38.1 g.) and magnesium oxide (0.11 mole, 4.4 g.) was heated at approximately 200° C. for 5 hours, the mixture being stirred during the early part of the heating period. Analysis of the product mixture showed 81% of the theoretical ionizable chlorine. The polymer was hydrolyzed by heating with conc. HCl at 170–175° in sealed tubes for 19 hours. Lysine monohydrochloride was recovered from the hydrolysis mixture by the usual procedure in 30% yield.

Example 13

Chlorobutyl hydantoin (0.2 mole, 38.1 g.) was added gradually to a methanol solution of tetramethylammonium methoxide (0.2 mole), previously prepared from sodium methoxide and tetramethylammonium chloride. The resulting solution of the tetramethylammonium salt of chlorobutyl hydantoin was evaporated to dryness under reduced pressure, and the residue heated gradually in an oil bath to about 175° C. An exothermic reaction occurred and the mixture rose spontaneously to a maximum temperature of 216° C. It was held above 175° for 1 hour, then allowed to cool.

Analysis of the product for ionizable chlorine showed the polymer-forming reaction to be complete. Hydrolysis of the polymer with hydrochloric acid, followed by the usual isolation procedure, yielded 75.4% of the theoretical quantity of lysine monohydrochloride.

Example 14

Dihydropyran (3 moles, 252 g.), water (600 cc.) and hydrochloric acid (15 cc. 1 N) was stirred together until the dihydropyran was dissolved. The mixture was cooled and a solution of 3 moles (153 g.) sodium cyanide in 360 cc. water added dropwise with stirring under carbon dioxide. Ammonium chloride (3 moles, 160.5 g.) was added and stirring under carbon dioxide continued at 45–60° C. for about 26 hours. On cooling, 232 g. of pure 5-(delta-hydroxybutyl) hydantoin crystallized. An additional crop of 52.5 g. with correct melting point but contaminated with a trace of sodium chloride was obtained by evaporating the mother liquor. The total yield was 55% of theoretical.

5-(delta-hydroxybutyl) hydantoin (0.5 mole, 86 g.) and water (40 cc.) were heated to fusion in a water bath and gaseous hydrogen bromide passed in with stirring until it was no longer absorbed at an appreciable rate (2.4 hours). The product was poured into hot water and cooled to crystallize. The dried crystals weighed 104 g. (88.8% of theory) and melted at 128–129.5° C. The melting point was not changed by recrystallization from methanol.

5-(delta-bromobutyl) hydantoin (0.2 mole, 47.0 g.) and anhydrous sodium carbonate (0.2 mole, 21.2 g.) were mixed in a beaker and heated by means of an oil bath. The mixture became molten when the bath temperature reached 136°. The bath temperature was raised to 167° C. during ½ hour, and held at 166–169° C. for 1½ hours, during which the mixture was stirred continuously. Samples were titrated periodically for bromide ion content, which reached 25.1% (97% of theory) at the end of the heating period. The product was cooled, ground in a mortar and extracted with 200 cc. of water to remove the inorganic salts; the recovery of water-insoluble polymer was 78% of theoretical. A 15.4 g. portion of the extracted polymer, theoretically equivalent to 0.1 mole of 5-(delta-bromobutyl) hydantoin, was sealed in a Carius tube with 35 cc. of concentrated hydrochloric acid and heated for 16½ hours at 150–160° C. The resulting solution was evaporated to dryness, the residue extracted with alcohol and pyridine added to precipitate lysine monohydrochloride; yield 14.8 g. (81%).

The term "dihydropyran" as used in the specification and the claims is intended to designate the compound 2,3-dihydro-1,4-pyran having the following formula:

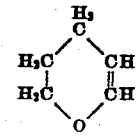

This is the dihydropyran commonly referred to as 2,3-dihydropyran.

Except as otherwise designated the term "lysine" refers to the compound in the form of its monohydrohalide, dihydrohalide, or other salts.

"Hydrating" is used in this specification and claims to mean combining with water, in accordance with the definitions of "hydrated" and "hydration" appearing in Hackh's Chemical Dictionary, third edition.

We claim:

1. The process for the production of lysine which comprises reacting in aqueous solution at elevated temperatures delta-hydroxyvaleraldehyde, a compound yielding ammonium ions, a compound yielding carbonate ions and a compound yielding cyanide ions to form 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, condensing said salt to form a polymer and hydrolyzing the resulting polymer.

2. Process for the production of lysine which comprises reacting in aqueous alkaline solution at elevated temperatures delta-hydroxyvaleraldehyde, a compound yielding ammonium ions, a compound yielding carbonate ions and a compound yielding cyanide ions to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with an alkali metal base to form an alkali metal salt of said hydantoin, heating the reaction mixture to effect condensation of said salt to form poly-3,5-tetramethylene hydantoin and hydrolyzing said poly-3,5-tetramethylene hydantoin.

3. The process of claim 2 wherein the alkali metal base is sodium carbonate.

4. Process for the production of lysine which comprises hydrating dihydropyran in dilute aqueous acid medium and reacting the resulting product mixture in aqueous solution with a compound yielding ammonium ions, a compound yielding carbonate ions and a compound yielding cyanide ions at elevated temperatures to produce 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, condensing said salt to form a polymer and hydrolyzing the resulting polymer.

5. Process for the production of lysine which comprises hydrating dihydropyran in dilute aqueous acid medium, and reacting the resulting product mixture in aqueous solution with a compound yielding ammonium ions, a compound yielding carbonate ions and a compound yielding cyanide ions at elevated temperatures, acidifying and heating the resulting reaction mixture and isolating 5-(delta-hydroxybutyl) hydantoin therefrom; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, condensing said salt to form a polymer and hydrolyzing the resulting polymer.

6. Process for the production of lysine which comprises reacting in aqueous solution at elevated temperatures delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with an alkali metal base to form an alkali metal salt of said hydantoin, heating the reaction mixture to effect condensation of said salt to form poly-3,5-tetramethylene hydantoin and hydrolyzing said poly-3,5-tetramethylene hydantoin.

7. Process for the production of lysine which comprises reacting in aqueous solution at temperatures of 60° to 120° C. delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at 115° to 135° C. to produce 5-(delta-chlorobutyl) hydantoin; reacting said 5-(delta-chlorobutyl) hydantoin with an alkali metal base to form an alkali metal salt of said hydantoin, heating the reaction mixture to a temperature within the range 100° to 200° C. to effect condensation of said salt to form poly-3,5-tetramethylene hydantoin and hydrolyzing said poly-3,5-tetramethylene hydantoin.

8. Process for the production of lysine which comprises hydrating dihydropyran in dilute aqueous acid medium and reacting the resulting product mixture in aqueous alkaline solution with a compound yielding ammonium ions, a compound yielding carbonate ions and a compound yielding cyanide ions at elevated temperatures to form 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, condensing said salt to form a polymer and hydrolyzing the resulting polymer.

9. Process for the production of lysine which comprises hydrating dihydropyran in dilute aqueous acid medium, and reacting the resulting product mixture in aqueous alkaline solution with a compound yielding ammonium ions, a compound yielding carbonate ions and a compound yielding cyanide ions at about 60 to 120° C., acidifying and heating the resulting reaction mixture with hydrochloric acid and isolating 5-(delta-hydroxybutyl) hydantoin therefrom, reacting said 5-(delta-hydroxybutyl) hydantoin with a compound from the group consisting of hydrogen chloride and hydrogen bromide at 115° to 135° C. to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, heating said salt at 100° to 200° C. to effect condensation of said salt to form a polymer and hydrolyzing the resulting polymer.

10. Process for the production of lysine which comprises hydrating dihydropyran in dilute aqueous acid medium and reacting the resulting product mixture in aqueous alkaline solution with a compound yielding ammonium ions, a compound yielding carbonate ions and a compound yielding cyanide ions at elevated temperatures to form 5-(delta-hydroxybutyl) hydantoin; contacting a mixture of said 5-(delta-hydroxybutyl) hydantoin and a material from the group consisting of 5-(delta-chlorobutyl) hydantoin and 5-(delta-bromobutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with a base from the group consisting of alkali metal, alkaline earth metal and quaternary ammonium bases to form a salt of said hydantoin, condensing said salt to form a polymer and hydrolyzing the resulting polymer.

11. Process for the production of lysine which comprises reacting in aqueous solution at elevated temperatures delta-hydroxyvaleraldehyde sodium cyanide and ammonium carbonate to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with an alkali metal base to form an alkali metal salt of said hydantoin, heating the reaction mixture to effect condensation of said salt to form poly-3,5-tetramethylene hydantoin and hydrolizing said poly-3,5-tetramethylene hydantoin.

12. Process for the production of lysine which comprises reacting in aqueous solution at elevated temperatures delta-hydroxyvaleraldehyde, sodium cyanide and ammonium chloride to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with an alkali metal base to form an alkali metal salt of said hydantoin, heating the reaction mixture to effect condensation of said salt to form poly-3,5-tetramethylene hydantoin and hydrolyzing said poly-3,5-tetramethylene hydantoin.

13. The process for the production of lysine which comprises reacting a compound from the group consisting of chlorobutyl hydantoin and bromobutyl hydantoin with a base from the group consisting of alkali metal, alkaline earth metal and quaternary ammonium bases to form a salt of said hydantoin, condensing said salt to form a polymer and hydrolyzing the resulting polymer.

14. The process of claim 13 wherein the base is an alkali metal base.

15. The process for the production of lysine which comprises reacting a compound from the group consisting of chlorobutyl hydantoin and bromobutyl hydantoin with sodium carbonate to form a sodium salt of the hydantoin, heating the reaction mixture to effect condensation of said sodium salt, separating poly-3,5-tetramethylene hydantoin from the resulting product mixture and hydrolyzing said poly-3,5-tetramethylene hydantoin.

16. The process for the production of lysine which comprises reacting a compound from the group consisting of chlorobutyl hydantoin and bromobutyl hydantoin with sodium carbonate at a temperature of 100° to 200° C. and hydrolyzing the resulting polymer.

17. The process of claim 16 wherein the molar ratio of sodium carbonate to hydantoin is about 1 to 1.

18. The process for the production of a hydantoin salt which comprises reacting a compound from the group consisting of chlorobutyl hydantoin and bromobutyl hydantoin with a base from the group consisting of alkali metal, alkaline earth metal and quaternary ammonium bases.

19. The process of claim 18 wherein the hydantoin is chlorobutyl hydantoin and the base is sodium carbonate.

20. The process for the production of poly-3,5-tetramethylene hydantoin which comprises reacting a compound from the group consisting of chlorobutyl hydantoin and bromobutyl hydantoin with a base from the group consisting of alkali metal, alkaline earth metal and quaternary ammonium bases and heating the reaction mixture to a temperature within the range 100° to 200° C.

21. The process of claim 20 wherein the hydantoin is chlorobutyl hydantoin and the base is sodium carbonate.

22. The process of claim 20 wherein the reaction product is extracted to remove excess alkali and by-product salt.

23. The process for the production of lysine which comprises hydrolyzing poly-3,5-tetramethylene hydantoin.

24. The process for the production of lysine which comprises hydrolyzing poly-3,5-tetramethylene hydantoin with an acid at 120° to 250° C.

25. The process for the production of lysine which comprises hydrolyzing poly-3,5-tetramethylene hydantoin with an alkali at 100° to 200° C.

26. The process for the production of lysine which comprises hydrolyzing poly-3,5-tetramethylene hydantoin with hydrochloric acid.

27. Poly-3,5-tetramethylene hydantoin having the formula

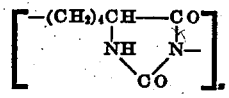

wherein $x$ is an integer.

NORMAN D. SCOTT.
ARTHUR O. ROGERS.

REFERENCES CITED

The following references are of record in the file of this patent:

Block, Chem. Reviews, vol. 38, p. 527 et seq. (1946).